(12) United States Patent
Reinck

(10) Patent No.: US 9,033,412 B2
(45) Date of Patent: May 19, 2015

(54) SAFETY SEAT AND METHOD FOR REDUCING STRESS ON AN OCCUPANT OF A MOTOR VEHICLE

(75) Inventor: Wilko Reinck, Bad Sassendorf (DE)

(73) Assignee: SCHROTH SAFETY PRODUCTS GMBH, Arnsberg (DE)

( * ) Notice: Subject to any disclaimer, the term of this patent is extended or adjusted under 35 U.S.C. 154(b) by 305 days.

(21) Appl. No.: 13/595,481

(22) Filed: Aug. 27, 2012

(65) Prior Publication Data

US 2013/0049415 A1 Feb. 28, 2013

(30) Foreign Application Priority Data

Aug. 31, 2011 (DE) .......................... 10 2011 053 156

(51) Int. Cl.
| | |
|---|---|
| *B60N 2/427* | (2006.01) |
| *B60N 2/24* | (2006.01) |
| *B60N 2/42* | (2006.01) |
| *F41H 7/04* | (2006.01) |
| *B64D 11/06* | (2006.01) |
| *B64D 25/04* | (2006.01) |
| *B64D 25/06* | (2006.01) |

(52) U.S. Cl.
CPC ................ *B60N 2/24* (2013.01); *B60N 2/4242* (2013.01); *B60N 2/42709* (2013.01); *B60N 2/42754* (2013.01); *F41H 7/046* (2013.01); *B64D 11/06* (2013.01); *B64D 25/04* (2013.01); *B64D 25/06* (2013.01); *B64D 11/0619* (2014.12); *B64D 11/062* (2014.12)

(58) Field of Classification Search
CPC ...... B60N 2/4242; B60N 2/688; B60R 22/16; B64D 2011/0627; B64D 2011/0668; B64D 25/06

USPC ............... 297/216.17, 216.16, 471, 472, 480, 297/484, 14, 344.18, 344.19, 344.2, 339; 296/68.1; 244/122 R
See application file for complete search history.

(56) References Cited

U.S. PATENT DOCUMENTS

| | | | | |
|---|---|---|---|---|
| 2,538,427 | A | * | 1/1951 | Brown et al. ............. 244/122 R |
| 2,829,702 | A | * | 4/1958 | Keating ..................... 297/183.9 |
| 3,314,720 | A | * | 4/1967 | Millington et al. ........ 297/216.1 |
| 3,868,143 | A | * | 2/1975 | Reilly ...................... 297/216.17 |
| 3,885,810 | A | | 5/1975 | Chika |
| 3,887,233 | A | * | 6/1975 | Garavaglia et al. ........... 297/478 |

(Continued)

FOREIGN PATENT DOCUMENTS

| | | |
|---|---|---|
| DE | 2 218 253 | 10/1973 |
| DE | 103 41 483 B3 | 3/2005 |

(Continued)

*Primary Examiner* — David R Dunn
*Assistant Examiner* — Tania Abraham
(74) *Attorney, Agent, or Firm* — Henry M. Feiereisen LLC

(57) ABSTRACT

In a method for reducing the impact of a force upon a person seated in a safety seat of a motor vehicle at least a seat unit of the safety seat is restrained at least in part by at least one support strap. The support strap is formed with an extension piece configured to lengthen when exposed to a load as a result of an accident or explosion. A winding unit holds the support strap to shorten an effective length of the support strap and to build up a force to maintain the support strap under tension after the support strap underwent a lengthening in an area of the extension piece as a result of a load caused by a force resulting from an accident or explosion so as to reestablish an effective length of the support strap for lengthening during a subsequent force impact.

18 Claims, 5 Drawing Sheets

(56) References Cited

U.S. PATENT DOCUMENTS

| | | | | |
|---|---|---|---|---|
| 4,099,778 | A * | 7/1978 | Lehr | 297/472 |
| 4,138,157 | A * | 2/1979 | Pickett et al. | 297/472 |
| 4,371,193 | A * | 2/1983 | Takada | 280/806 |
| 4,474,347 | A * | 10/1984 | Mazelsky | 244/122 R |
| 4,958,853 | A * | 9/1990 | Doty | 280/801.1 |
| 5,676,336 | A * | 10/1997 | Nefy et al. | 244/122 R |
| 5,692,705 | A * | 12/1997 | Bellais | 244/122 R |
| 5,910,457 | A | 6/1999 | Kolb | |
| 6,152,401 | A * | 11/2000 | Green | 244/118.6 |
| 6,409,243 | B1 * | 6/2002 | Hansen | 296/68.1 |
| 6,446,910 | B1 * | 9/2002 | Knoll et al. | 244/122 R |
| 6,585,190 | B2 * | 7/2003 | Mort | 244/122 R |
| 6,820,931 | B2 * | 11/2004 | Ruff et al. | 297/216.17 |
| 6,913,314 | B2 * | 7/2005 | Hansen | 297/216.1 |
| 7,484,799 | B2 * | 2/2009 | Meyer | 297/216.17 |
| 7,513,558 | B2 | 4/2009 | Hansen | |
| 7,644,992 | B2 * | 1/2010 | Becker et al. | 297/474 |
| 7,866,606 | B2 * | 1/2011 | Peck | 244/122 R |
| 7,887,139 | B2 * | 2/2011 | Yamada et al. | 297/452.18 |
| 8,091,964 | B2 * | 1/2012 | Carter et al. | 297/216.17 |
| 8,317,266 | B2 * | 11/2012 | Alfredsson et al. | 297/344.15 |
| 8,469,400 | B2 * | 6/2013 | Merrill et al. | 280/801.1 |
| 2004/0160095 | A1 * | 8/2004 | Swierczewski | 297/216.15 |
| 2005/0264082 | A1 | 12/2005 | Kumpf et al. | |
| 2010/0052401 | A1 * | 3/2010 | Jessup et al. | 297/471 |
| 2010/0207433 | A1 * | 8/2010 | Hahn | 297/216.1 |
| 2010/0270836 | A1 | 10/2010 | Mowry et al. | |
| 2012/0025570 | A1 | 2/2012 | Reinck | |
| 2012/0200128 | A1 * | 8/2012 | Soliz | 297/216.17 |

FOREIGN PATENT DOCUMENTS

| | | |
|---|---|---|
| DE | 102008005422 | 10/2008 |
| WO | WO 96/31642 A1 | 10/1996 |
| WO | WO 02/26524 | 4/2002 |

* cited by examiner

SAFETY SEAT AND METHOD FOR REDUCING STRESS ON AN OCCUPANT OF A MOTOR VEHICLE

CROSS-REFERENCES TO RELATED APPLICATIONS

This application claims the priority of German Patent Application, Serial No. 10 2011 053 156.4, filed Aug. 31, 2011, pursuant to 35 U.S.C. 119(a)-(d), the content of which is incorporated herein by reference in its entirety as if fully set forth herein.

BACKGROUND OF THE INVENTION

The present invention relates to a safety seat, and to a method for reducing stress on an occupant of a motor vehicle.

The following discussion of related art is provided to assist the reader in understanding the advantages of the invention, and is not to be construed as an admission that this related art is prior art to this invention.

It has been known to decouple safety seats in armored motor vehicles from the vehicle's floor, so that the forces which act when, for example, the vehicle travels over a mine are not transmitted directly by the structure of the seat to the vehicle occupant. Driving over a mine often has the result that not only the vehicle as a whole is lifted from the ground but also that the floor of the vehicle is buckled inward to a considerable extent. Seats attached to the vehicle floor thus transmit to the vehicle's occupants not only the impacts and vibrations encountered during normal driving but also the much greater forces of acceleration which occur when a mine explodes or the vehicle is involved in an accident.

One approach to decouple safety seats from the vehicle's structure involves a suspension of the seats by the use of pulling elements. Pulling elements are unable to transmit compressive forces so that a shockwave caused by a mine explosion is not transmitted to the seat and thus not to the occupant. Seats which are held by pulling members, however, require a large number of fixation points than seats with rigid connections.

It would be desirable and advantageous to provide an improved safety seat and an improved method for reducing stress on an occupant of a motor vehicle seated on a safety seat to obviate prior art shortcomings and to provide a lightweight construction while yet producing a safety seat that is reliable in operation.

SUMMARY OF THE INVENTION

According to one aspect of the present invention, a method for reducing the impact of a force upon a person seated in a safety seat of a motor vehicle includes restraining at least a seat unit of the safety seat at least in part by at least one support strap, forming the at least one support strap with an extension piece configured to lengthen when exposed to a load as a result of an accident or explosion, and holding the at least one support strap in a winding unit to shorten an effective length of the at least one support strap and to build up a force to maintain the at least one support strap under tension after the support strap underwent a lengthening in an area of the extension piece as a result of a load caused by a force resulting from an accident or explosion so as to reestablish an effective length of the support strap for lengthening during a subsequent force impact.

Advantageously, the support strap can be made of textile material, e.g. nylon or polyester.

The present invention resolves prior art problems by providing the support strap with an extension piece intended to lengthen the support strap under extreme conditions such as in the event of an accident or explosion. The extension piece may for that purpose include at least two loops lying above another and connected to one another via at least one predetermined break point. The presence of a winding unit is also an important aspect of the present invention, as the winding unit winds up the support strap again in the event the support strap underwent a lengthening through liberation of a loop at a predetermined break point. The winding unit builds up a biasing force so that the support strap retracts immediately when relaxed and becomes taut by the biasing force, applied by a spring force for example. The structure of the safety seat held by the support strap, i.e. at least the seat unit or also the entire safety seat which is held by the support strap in relation to the vehicle, is immediately made available to resist further stress, in particular for the so-called slam down in which a vehicle becomes airborne as a result of a mine explosion and falls back again, whereby the occupants are exposed again to high forces.

A method according to the present invention is beneficial in particular in a situation when the force resulting from an accident or explosion is effective substantially vertically upwards so that the safety seat in its entirety is lifted up to an upper dead center, wherein the winding unit shortens the support strap once the upper dead center has been reached or at a point in time at which the support strap is relaxed and before the safety seat is again lowered. Of course, the support strap can be wound up also on its path from the upper dead center to the lower dead center. It is only important to provide the possibility to build up energy in the area of the support strap when the occupants of a vehicle are again exposed to a force impact.

Advantageously, the extension piece of the support strap may include a plurality of predetermined break points in the form of a tear seam or adhesive bond which tear or are destroyed in the event of an overload and liberate a loop of the support strap. The basic principle of such a predetermined break point is that the length of a support strap basically does not increase when under standard load, i.e. during normal travel conditions, but it does become longer as soon as a certain load level is exceeded. When this load level is reached, the loops or strap layers come apart as a result of the destruction of the tear seams or adhesive bonds. The load level is designed to be "falling", because as a result the forces change or are absorbed in a favorable manner with respect to the person to be protected.

According to another advantageous feature of the present invention, the at least one support strap can be rendered effective between a structure of the motor vehicle and the safety seat in its entirety, including the seat unit. It is, of course, also conceivable, to render the energy-absorbing element, i.e. the support strap, effective merely between a back unit of the safety seat and the seat unit.

The provision of an energy-absorbing element, especially in the form of a predetermined break point of a textile support strap, is light in weight regardless of its arrangement, requires little space and is extremely effective at absorbing energy. In addition, these types of support straps are relatively low in cost and easy to handle. Assembly and disassembly is technically simple and can be rapidly implemented.

According to another aspect of the present invention, a safety seat for a motor vehicle includes a seat unit, at least one support strap restraining at least the seat unit at least in part, with the support strap having an extension piece configured to lengthen when exposed to a load as a result of an accident or explosion, and a winding unit holding the support strap, with the winding unit configured to shorten an effective length of the support strap and to maintain the support strap under tension in the event the support strap underwent a lengthening as a result of a load caused by a force resulting from an accident or explosion so as to reestablish the extension piece within the effective length of the support strap for lengthening during a subsequent force impact.

According to another advantageous feature of the present invention, the safety seat has a back unit which can have an upper part for connection to a structure of a motor vehicle, and a lower part configured to allow a lowering thereof in relation to the upper part of the back unit. The motor vehicle structure to which the safety seat can be attached can be in particular a section of the wall of the vehicle. Conceivably, the back unit may also be attached to the roof of the passenger compartment. What is relevant is the possibility for the lower part of the back unit to be dropped with respect to the upper part, and a decoupling of the safety seat from the floor of the motor vehicle.

According to another advantageous feature of the present invention, the lower part can be guided on the upper part and connected to the upper part by the support strap.

According to another advantageous feature of the present invention, the seat unit can have a forward part which can be articulated to the upper part of the back unit, and a rear part which can be articulated to the lower part of the back unit. The connection between the rear part of the seat unit and the lower part of the back unit can be realized in such a way that the rear part of the seat unit drops farther than the forward part of the seat unit, especially in the case of g-forces acting in the vertical direction, when a force resulting from an accident or an explosion acts on the motor vehicle.

The presence of a seat unit in accordance with the present invention is not only advantageous because of the decoupling from the vehicle floor but also because submarining is avoided, since only the rear part of the seat unit, not the forward part of the seat unit, drops. The person sitting in the safety seat is thus necessarily forced to bend his thighs more closely toward the upper body in the sitting position, so that a lap belt, which is connected in particular to the rear part of the seat unit, rests tightly on the person. Submarining is prevented.

According to another advantageous feature of the present invention, a bracing strap can be provided to connect the forward part of the seat unit to the upper part of the back unit. The bracing strap can hereby be connected to the forward part for rotation about a center of rotation which is spaced from the back unit at a horizontal distance which is greater than a horizontal distance of a center of gravity of a person sitting on the seat unit. As a result, an anti-submarining effect can be obtained. The desired anti-submarining effect is obtained under the assumption that the g-forces in question are acting essentially in the vertical direction.

According to another advantageous feature of the present invention, the center of rotation for the lateral bracing straps can be located a certain distance away from a forward edge of the forward part of the seat unit, so that, when the rear part drops, the forward part of the seat unit is simultaneously lifted. This further enhances the anti-submarining effect of a safety seat according to the present invention.

According to another advantageous feature of the present invention, the safety seat may have a safety belt arrangement having shoulder belts fastened to the lower part of the back unit and passed around the upper part of the back unit, with the shoulder belts being tensed when the lower part of the back unit drops. When the shoulder belts are taut, the upper body is drawn firmly against the back unit. The tightening of the shoulder belts occurs exclusively as a result of the dropping of the lower part of the back unit. For this purpose, the end sections of the shoulder belt which pass over the upper part of the back unit can be connected to the lower part of the back unit, so that the shoulder belts are pulled toward the rear in the area of the shoulders. As an alternative, it may also be conceivable to fasten the upper regions of the shoulder belts to the upper part of the back unit, whereas the lower ends of the shoulder belts are connected to the lower part of the back unit, so that they are pulled tight when the rear part of the seat or the lower part of the back unit drops.

Of course, it may also be possible for both ends of the shoulder belts, i.e. both the bottom end and also the top end of each belt, to be connected to the lower part of the back unit after passing around the upper part of the back unit.

The back unit itself does not necessarily form the backrest for support of the upper body of the person. Rather, a backrest unit made of textile fabric can be arranged between the bracing straps which hold the forward part of the safety seat and can thus be held in place by them. The bracing straps are pulled tight by the weight of the person on the safety seat so that the backrest unit retains its shape.

The backrest unit can be configured in such a way that it is located a certain distance away from the back unit with the support straps so that the backrest unit does not interfere with the support straps. It is also conceivable, of course, that the support straps could give additional support to the backrest unit.

According to another advantageous feature of the present invention, the winding unit, when integrated in the safety seat, can be arranged at a lower end of the support strap. As a result, the winding unit is lowered together with the rear end of the seat unit when subject to a load and is lifted again together with the seat unit in the absence of the load, i.e. when relaxed. As a result, the seat unit is pulled upwards.

To ensure a complete decoupling of a person from the vehicle floor, provision may be made for a footrest which is connected to the lower part of the back unit and extends underneath, at a certain distance away from and parallel to, the seat unit without touching the floor of the vehicle. The distance is selected so that the feet of the person can rest comfortably. The footrest unit can be telescoping and, when not in use, can be collapsed so as to prevent the footrest to project interferingly beyond the forward part of the seat unit. As a result of its connection to the lower part of the back unit, the footrest drops simultaneously with the seat unit while still being kept from contact with the floor of the motor vehicle. The person therefore remains decoupled from the floor of the vehicle even after the seat unit has dropped.

According to another advantageous feature of the present invention, the support strap may have an indicator for indicating an overload. For example, the indicator may be realized as a color mark which is provided in the overlapping loops of the extension piece and becomes visible only after the predetermined break point opens. This is a clear sign that the support strap should be replaced. An indicator of this type requires no additional space outside the support strap, is light in weight, and is also placed in a protected location.

According to another advantageous feature of the present invention, the safety seat may have a second type of a support strap which is configured in the absence of a winding unit. The second type of support strap has the function to relieve the first type of support strap and thus the winding unit. As a consequence of the presence of two different types of support straps, there is also the option to provide them with predetermined break points of different load level. It is, for example, conceivable to configure the support strap without winding unit for a first load so as to tear as soon as being exposed to an explosive impact or load, and to configure the support strap with winding unit for a second load in the form of a slam down. It may also be conceivable to configure the support strap without winding unit for executing a fixed function so as to tear when exposed to a fairly small load, and to configure the support strap with winding unit with two predetermined break points for different load levels so as to absorb predominantly forces caused by an explosion or accident.

A lightweight safety seat according to the present invention is especially beneficial for use in vehicles which can be subjected to high impact-like loads in the vertical direction such as aircraft, especially helicopters, during a landing or a crash, and also for use in armored vehicles which are subject to the danger of land mines. The safety seat according to the present invention is able to absorb a significant portion of the g-forces acting in the vertical direction and thus reduce the effects on the occupants, while at the same time the safety seat is able to hold the occupants securely in place even though decoupled from the floor of the vehicle without the occurrence of the disadvantageous submarining effect.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
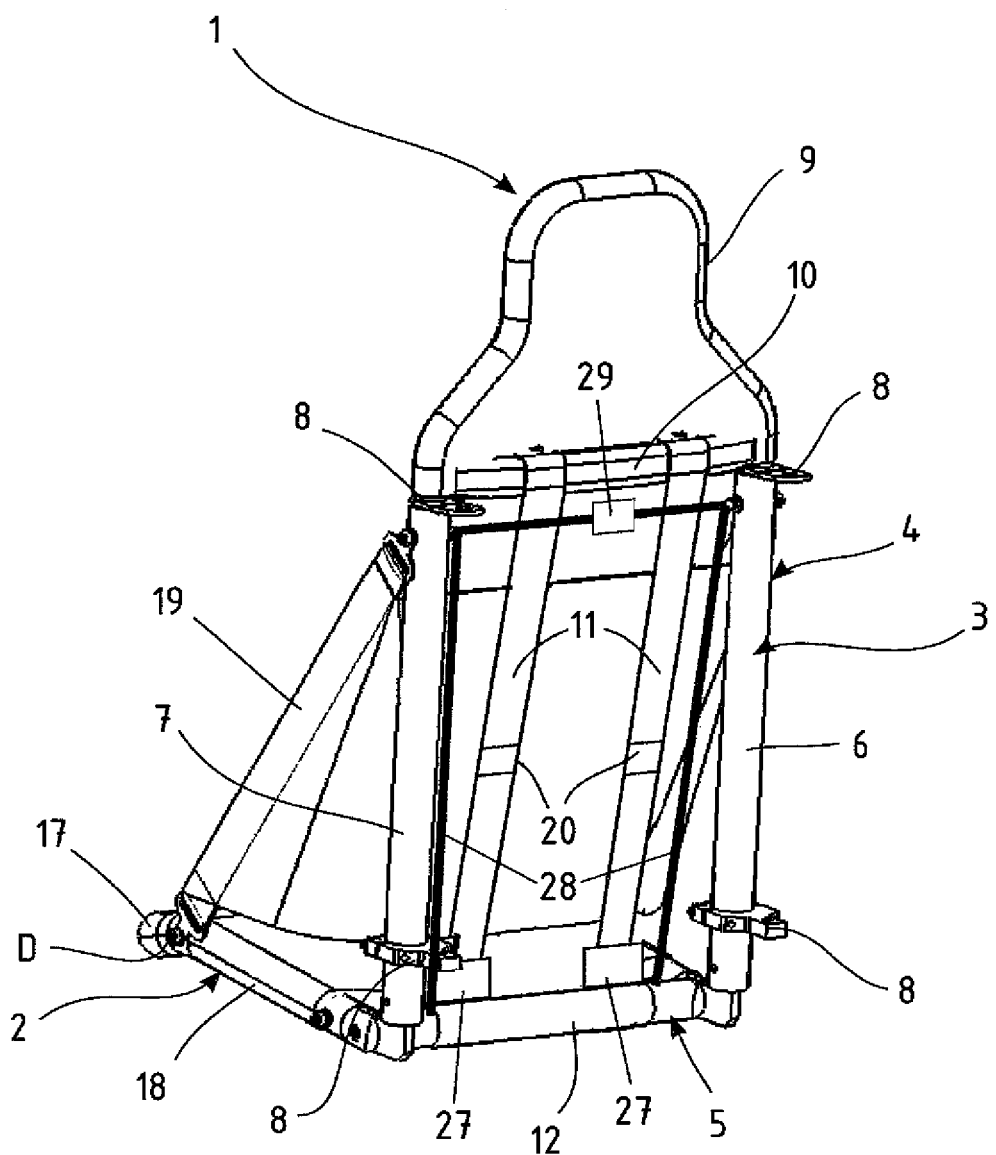
FIG. 1 is a rear view of a first embodiment of a safety seat.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a rear view of a first embodiment of a safety seat, which is generally designated by reference numeral 1 and which can be installed in a motor vehicle (not shown), e.g. an armored land vehicle, an aircraft, or a watercraft. The safety seat 1 includes a seat unit 2 and a back unit 3. The back unit 3 has a frame-like upper part 4 and a lower part 5 which can be shifted downward with respect to the upper part 4. Only the upper part 4 of the back unit 3 is intended for connection to a structure of the motor vehicle. For this purpose, two spaced-apart guide tubes 6, 7 are provided on the upper part 4. Fasteners 8 are arranged at the top end of each guide tube 6, 7 and also in the area of the bottom ends of the guide tubes 6, 7 for firmly connecting the guide tubes 6, 7 to the structure of the motor vehicle.

The lower fasteners 8 are configured as clamps which extend around the guide tubes 6, 7 with a clamping action. Because of their clamping type of attachment, the lower fasteners 8 can be attached slightly higher or slightly lower onto the guide tubes 6, 7 so that the distance between the upper and the lower fasteners 8 can be varied. This facilitates adjustment of the installation of the safety seat 1 to suit different mounting situations and vehicle body designs.

The guide tubes 6, 7 are arranged vertically in particular. In this exemplary embodiment, the guide tubes 6, 7 can also be slightly slanted, i.e. mounted at an angle of 5-20° in relation to the vertical, so that the back unit 3 acquires a slight slant.

A headrest 9 is arranged at the top end of the back unit 3 and includes a frame component which has a width tapering toward the top and which is connected to the top ends of the guide tubes 6, 7. The frame component is covered by a textile covering. Arranged at the bottom end of the headrest 9 between the two guide tubes 6, 7 is a cross piece 10 for attachment of two support straps 11 which extend in parallel spaced-apart relationship. The support straps 11 extend from the cross piece 10 downwards to a lower cross piece 12, which is a component of the lower part 5 of the back unit 3. Retractors in the form of a winding unit 27 are provided between the cross piece 10 and the support straps 11 and assume a locked position at any time.

Figure 2:
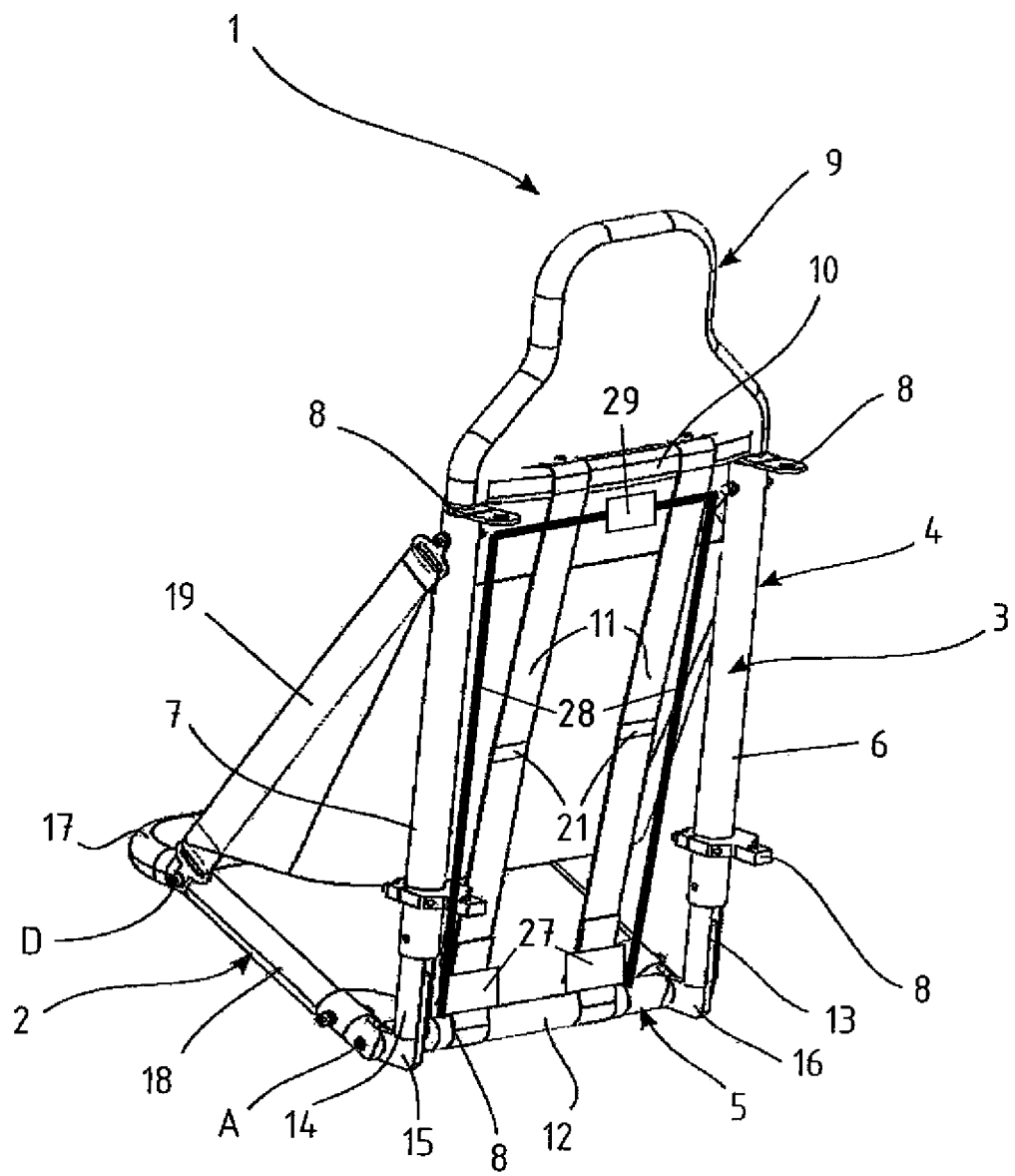
FIG. 2 is a rear view of the safety seat of FIG. 1, wherein the lower part of the back unit is lowered.

The lower part 5 can be shifted in a translational manner in relation to the upper part 4 of the back unit 3, as can be seen in FIG. 2. The lower part 5 has insertion profiles 13, 14 which fit into the associated guide tubes 6, 7 and are guided by them. The insertion profiles 13, 14 can be shifted only in a translational manner and are rigidly connected to the lower cross piece 12. Connecting elements 15, 16 connect the respective insertion profiles 13, 14 to the lower cross piece 12.

The connecting elements 15, 16 also have a connection for the seat unit 2. The pivot axis A, i.e., the point where the connecting elements 15, 16 and the seat unit 2 are joined, lies hereby on the side of the insertion profiles 13, 14 facing away from the lower cross piece 12. In other words, the lower cross piece 12 is located between the pivot axis A of the seat unit 2 and the insertion profiles 13, 14, which, in this non-limiting embodiment of the invention, proceed upward from the connecting elements 15, 16. The connecting elements 15, 16 thus have a substantially L-shaped configuration. As a result, the lower cross piece 12 is also shifted in relation to the upper cross piece 10 in the direction toward the seat unit 2, so that the support straps 11 extend at an angle to the plane defined by the straight guide tubes 6, 7.

The seat unit 2 has a forward part 17 and a rear part 18. The rear part 18 is connected pivotably to the lower part 5 of the back unit 3 via the pivot axis A. As a result, the entire seat unit 2 can be configured as a folding seat and folded up when not in use. Arranged between the forward part 17 and rear part 18 is a connection point for a bracing strap 19 which connects the shorter forward part 17 of the seat unit 2 to the upper part 4 of the back unit 3. The bracing strap 19 extends for this purpose to the top end of the upper part 4, namely, to a point just below the fasteners 8, which, in the present non-limiting exemplary embodiment, is located just below the upper cross piece 10.

The bracing strap 19 is connected in an articulated manner to the forward part 17. The center of rotation D, where the bracing strap 19 is connected to the seat unit 2, is located at a greater horizontal distance from the back unit 3 than the center of gravity (not shown) of a person sitting on the safety seat 1. This is also true for the reason that the forward part 17 is much shorter than the rear part 18 of the seat unit 2. As a result, only the thigh of the person is located in the area of the forward part 17, whereas the upper body is behind the center of rotation D near the back unit 3. The overall center of gravity of the person is therefore closer to the back unit 3.

When the support straps 11 are subjected to a load caused by vertically acting g-forces, as encountered during a helicopter crash or a mine explosion underneath a motor vehicle, acceleration forces are introduced into the back unit 3 via the fasteners 8. The upper part 4 of the back unit 3 is shifted. Via the support straps 11, shown in midsection of the drawing pane, a force is also introduced into the lower part 5. In addition, second types of support straps 28 are provided which extend in substantial parallel relation to the support straps 11. The support straps 28 are connected to one another in the area of the upper cross piece 10 and include an extension piece 29 which in the shown non-limiting exemplary embodiment is provided in midsection in proximity to the cross piece 10 and operates as a predetermined break point. As a result, the support straps 28 can extend in the area of the extension piece 29 in the event of an overload.

Figures 5, 6:
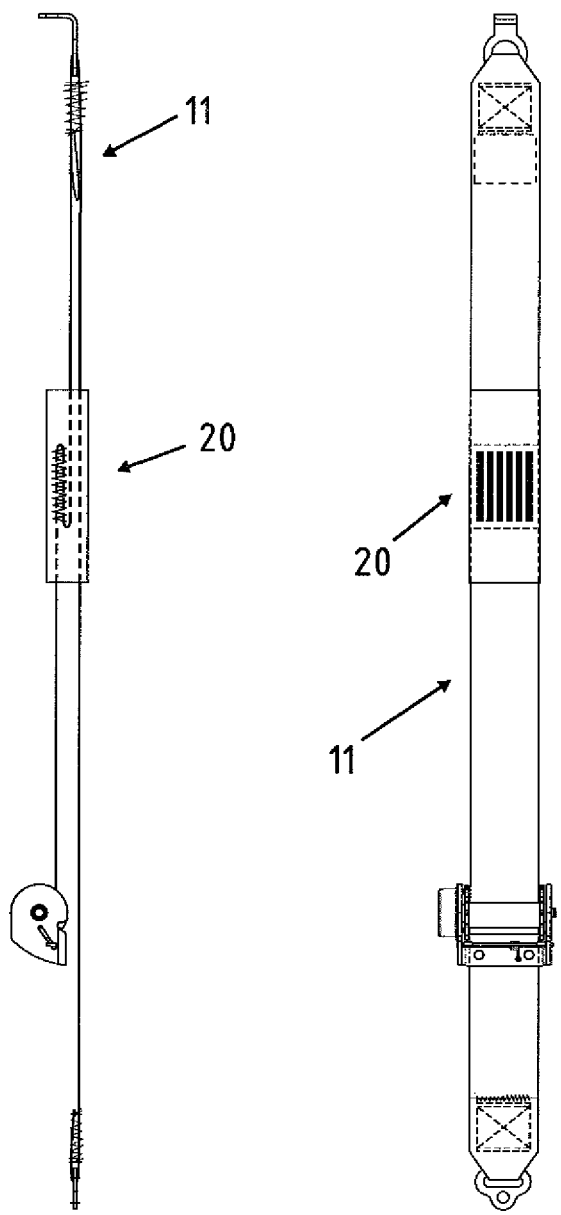
FIG. 5 is a side view of a support strap of the safety seat.
FIG. 6 is a plan view of the support strap of FIG. 5.

Each of the central support straps 11 are also provided with an extension piece 20 intended to lengthen as a result of a force caused by an accident or explosion. The extension pieces 20, 29 are configured to include several strap layers or loops lying on top of each other that are connected to each other by at least one predetermined break point configured as a tear seam or an adhesive bond. This is shown by way of example in FIGS. 5 and 6 with respect to the support strap 11. When a certain load level is exceeded, the strap layers come apart and the predetermined break points are destroyed. The support straps 11, 28 thus become longer, with the result that the lower part 5 drops downward under the weight of the person sitting on the seat unit 2. The loads transmitted to the occupants are therefore much weaker than would be the case with a fixed structure.

An elevation of the entire safety seat 1 including the back unit 3 is necessarily followed by a lowering of the vehicle again, including of the attached seat. The safety seat 1 is relieved at the upper point of reversal of the lifting movement. Inertia causes the occupant to remain briefly in the upper dead center before the motor vehicle and the back unit 3 of the safety seat 1 move downward again. It is at this moment that the winding unit 27 becomes operational to wind up the liberated length of both central support straps 11 so that the rear part 18 of the seat unit 2 is lifted and virtually shifted to its original position. The central support straps 11 are now ready to again liberate as energy-absorbing element when a certain load level is exceeded a predetermined break point in the area of its extension piece 20 so that the rear part 18 of the seat unit 2 can drop again. This reduces again stress on the occupant.

As further shown in FIG. 2 by way of example, the support straps 11 can be provided with an indicator 21 in the area of the predetermined break points. The indicator 21 becomes visible only after the predetermined break points have been destroyed. It is thus possible to recognize immediately when these support straps 11 should be replaced.

Figure 3:
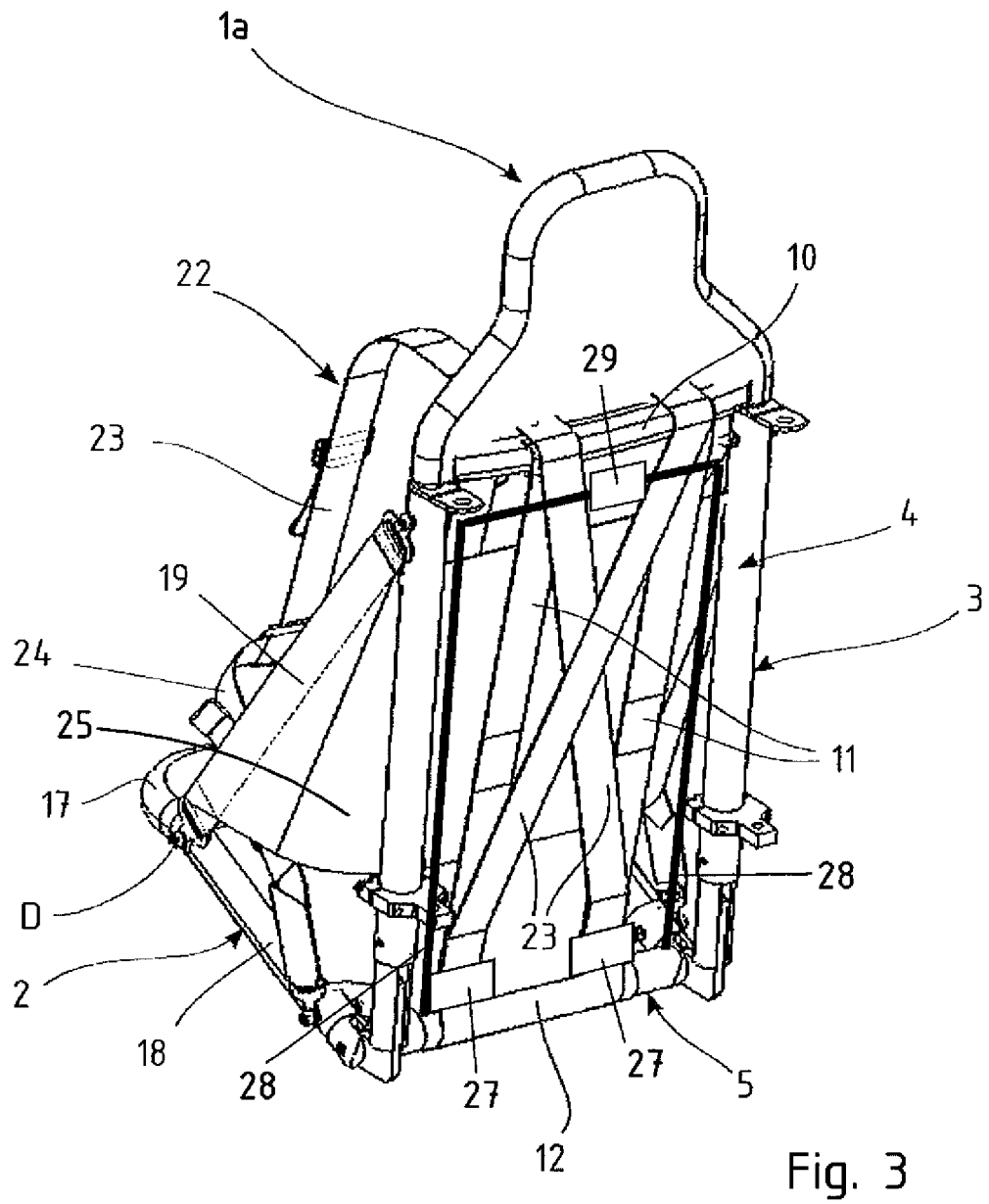
FIG. 3 is a rear view of a second embodiment of a safety seat.

Referring now to FIG. 3, there is shown is a rear view of a second embodiment of a safety seat, generally designated by reference numeral 1a. Parts corresponding with those in FIGS. 1-2 are denoted by identical reference numerals and not explained again. The description below will center on the differences between the embodiments. In this embodiment, provision is made for a safety belt arrangement 22 with shoulder belts 23 and a lap belt 24. The shoulder belts 23 are guided over the upper cross piece 10, cross each other as they run down the rear side of the back unit 3, and are connected at their bottom ends to the lower cross piece 12. When the predetermined break points are destroyed and thus the lower part 5 drops, the top ends of the shoulder belts 23 are pulled backward as a result of the downward movement of the lower part 5. The occupant is thus pressed against the safety seat 1 and held in the seated position.

The lap belt 24 is further connected to the U-shaped frame structure of the seat unit 2 at a short distance from the pivot axis A of the seat unit 2. When the seat unit 2 drops, the lap belt 24 is also pulled downward at its abutment points, whereas simultaneously the forward part 17 of the seat unit 2 is elevated. As a result, the occupant is held securely on the seat. It is impossible for the occupant to submarine.

A backrest unit 25 is arranged between the bracing straps 19, which extend along the long sides of the safety seat 1. The shell-like backrest unit 25 is made of textile fabric and is held in place exclusively by the bracing straps 19.

Figure 4:
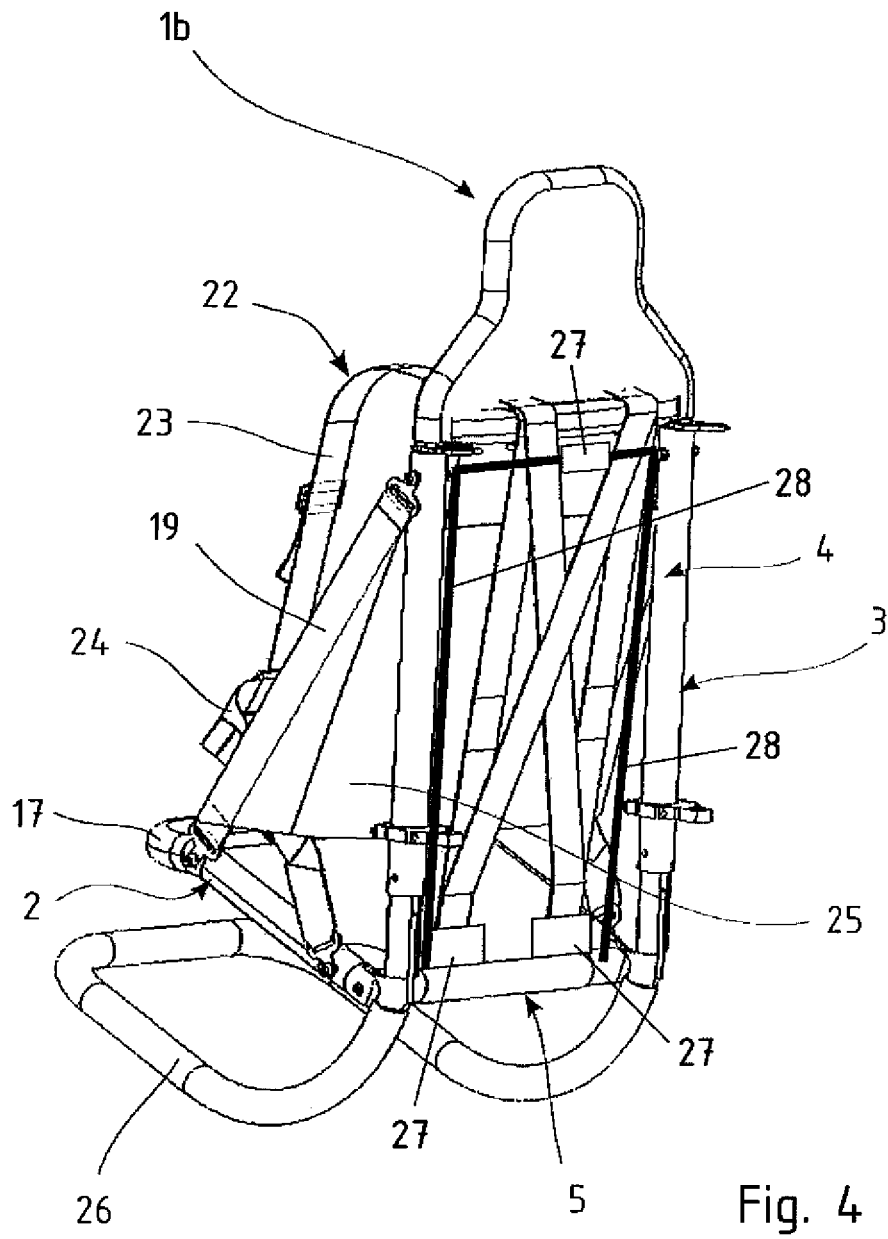
FIG. 4 is an angled rear view of a third embodiment of a safety seat.

FIG. 4 shown a rear view of a third embodiment of a safety seat, generally designated by reference numeral 1b. Parts corresponding with those in FIGS. 1-3 are denoted by identical reference numerals and not explained again. The description below will center on the differences between the embodiments. In this embodiment, provision is made for an additional footrest 26 which has a substantially U-shaped configuration and is connected to the connecting elements 15, 16. The footrest 26 begins on the side opposite the insertion profiles 13, 14, extends forward in an arc toward the seat unit 2, and then extends parallel to the seat unit 2. The forward end of the footrest 26 is arranged in such a way that the occupant can comfortably place his feet on the curved, closed forward part of the footrest 26. As a result of its rigid connection to the connecting elements 15, 16, the footrest 26 shifts in parallel relation to the seat unit 2. The footrest 26 is not connected to the floor of the vehicle and drops simultaneously with a lowering of the rear part 18 of the seat unit 2.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of reducing the impact of a force upon a person seated in a safety seat of a motor vehicle, comprising:
    restraining at least a seat unit of the safety seat at least in part by at least one support strap;
    forming the at least one support strap with an extension piece configured to lengthen when exposed to a load as a result of an accident or explosion;
    holding the at least one support strap in a winding unit to shorten an effective length of the at least one support strap and to build up a force to maintain the at least one support strap under tension after the support strap underwent a lengthening in an area of the extension piece as a result of a load caused by a force resulting from an accident or explosion so as to reestablish an effective length of the support strap for lengthening during a subsequent force impact;

connecting an upper part of a back unit to a structure of a motor vehicle and configuring a lower part of the back unit to allow a lowering thereof in relation to the upper part of the back unit;

articulating a forward part of the seat unit to the upper part of the back unit and articulating a rear part of the seat unit to the lower part of the back unit and configuring the rear part to drop father than the forward part of the seat unit when a force resulting from an accident or explosion acts on the motor vehicle.

2. The method of claim 1, wherein the safety seat in its entirety is lifted up to an upper dead center, when the force resulting from an accident or explosion is effective substantially vertically upwards, wherein the winding unit shortens the support strap once the upper dead point has been reached and before the safety seat is again lowered.

3. The method of claim 1, further comprising providing the extension piece of the support strap with several predetermined break points in the form of a tear seam or adhesive bond which tear in the event of an overload and liberate a loop of the support strap.

4. The method of claim 1, wherein the at least one support strap is rendered effective between a structure of the motor vehicle and the safety seat in its entirety, including the seat unit.

5. The method of claim 1, wherein the at least one support strap is rendered effective between a back unit of the safety seat and the seat unit.

6. A safety seat for a motor vehicle, comprising:
a seat unit;
at least one first support strap restraining the at least one seat unit at least in part, said first support strap having an extension piece configured to lengthen when exposed to a load as a result of an accident or explosion; and
a winding unit holding the first support strap, said winding unit configured to shorten an effective length of the first support strap and to maintain the first support strap under tension in the event the first support strap underwent a lengthening as a result of a load caused by a force resulting from an accident or explosion so as to reestablish the extension piece within the effective length of the support strap for lengthening during a subsequent force impact; and
a back unit having an upper part for connection to a structure of a motor vehicle, and a lower part configured to allow a lowering thereof in relation to the upper part of the back unit, wherein the seat unit has a forward part which is articulated to the upper part of the back unit, and a rear part which is articulated to the lower part of the back unit and is configured to drop father than the forward part of the seat unit when a force resulting from an accident or explosion acts on the motor vehicle.

7. The safety seat of claim 6, wherein the lower part is guided on the upper part and connected to the upper part by the first strap.

8. The safety seat of claim 6, wherein the extension piece has at least two loops overlapping one another in a longitudinal direction and connected to one another by at least one predetermined break point.

9. The safety seat of claim 8, wherein the at least one predetermined break point of the first support strap has a failing load level.

10. The safety seat of claim 6, wherein the first support strap has a lower end in confronting relationship to the seat unit, said winding unit being arranged at the lower end of the first support strip.

11. The safety seat of claim 6, further comprising a bracing strap connecting the forward part of the seat unit to the upper part of the back unit, sad bracing strap being connected to the forward part for rotation about a center of rotation, wherein the forward part extends in prolongation of the rear part at a length which is shorter than the length of the rear part.

12. The safety seat of claim 11, wherein the center of rotation of the bracing strap is located at a distance away from a forward edge of the forward part of the seat unit, so that, when the rear part drops, the forward part of the seat unit is simultaneously lifted.

13. The safety seat of claim 6, further comprising a safety belt arrangement having shoulder belts fastened to the lower part of the back unit and passed around the upper part of the back unit, said shoulder belts being tensed when the lower part of the back unit drops.

14. The safety seat of claim 6, further comprising at least one second support strap extending substantially parallel to the first support strap.

15. The safety seat of claim 6, wherein the first support strap has an indicator for indicating an overload.

16. The safety seat of claim 15, wherein the extension piece has at least two loops overlapping one another in a longitudinal direction and connected to one another by at least one predetermined break point, said indicator being configured as a color mark provided in the overlapping loops of the extension piece and becoming visible only after the predetermined break point opens.

17. The safety seat of claim 6, wherein the first support strap is made of textile material.

18. The safety belt of claim 17, wherein the textile material is nylon or polyester.

* * * * *